United States Patent [19]

Brown, Jr.

[11] 4,129,947

[45] Dec. 19, 1978

[54] GAUGE AND METHOD FOR DETERMINING THE NUMBER OF WORDS PER PRINTED PAGE

[76] Inventor: Carl F. Brown, Jr., 105 Fernbrook Cir., Spartanburg, S.C. 29302

[21] Appl. No.: 852,618

[22] Filed: Nov. 18, 1977

[51] Int. Cl.[2] .......................... B42D 15/00; G01B 5/00

[52] U.S. Cl. .......................................... 33/1 B; 33/1 S

[58] Field of Search ............... 33/1 B, 1 C, 1 S, 1 BB, 33/111, 174 R; 35/35 B, 39; 283/1 A

[56] References Cited

U.S. PATENT DOCUMENTS

| | | | |
|---|---|---|---|
| 972,528 | 10/1910 | Halloran | 33/1 B |
| 1,354,977 | 10/1920 | Kammeyer | 33/1 B |
| 1,796,955 | 3/1931 | Morris | 33/111 |
| 2,376,811 | 5/1945 | Rigby | 33/1 B |

*Primary Examiner*—Richard R. Stearns
*Attorney, Agent, or Firm*—B. B. Olive

[57] ABSTRACT

A gauge is provided for measuring the width of a selected word, for example "the", and using this width to determine the number of words per line on a printed page. The same gauge, in one embodiment of the invention, also includes means for determining the number of lines per page thus enabling the user to estimate the number of words per printed page for speed reading purposes.

3 Claims, 2 Drawing Figures

GAUGE AND METHOD FOR DETERMINING THE NUMBER OF WORDS PER PRINTED PAGE

BACKGROUND OF THE INVENTION

1. Field of the Invention

The invention broadly relates to speed reading devices and more particularly to gauges for measuring the number of words per line and number of lines per page in order to determine the number of words per printed page for speed reading purposes.

2. Description of the Prior Art

In the printing trade, transparent sheet gauges have been previously proposed for measuring the quantity of material which can be printed in a particular available space. Such gauges use printed indicia related to particular type choices. Typical prior art is found in U.S. Pat. No. 1,354,977 and U.S. Pat. No. 2,376,811. While these gauges may be useful in determining the amount of printed matter which can be accommodated in a particular blank space, they are neither adapted nor intended to be used for estimating the number of words per page in a variety of type style and gendre', i.e., nature of writing, scientific, fiction, poetry, et cetera. Neither of these gauges are intended to be used for determining a person's reading rate.

The most popular type of device for determining reading rate is the type of device which mechanically paces the reader by moving the material being read past the reader at some measurable rate or by moving some kind of guide, line by line, as the person reads and the rate of moving the guide is used to determine the reading rate.

A number of mechanical pacing devices are available. As an example, reference is made to Model TDL-1 "Reading Rate Controller" sold by the Three Dimension Company, Chicago, Illinois. Another such device is termed the "SRA Reading Accelerator" which is sold by Science Research Association, also of Chicago, Illinois. Another such device is the "Shadowscope Reading Pacer" sold by Psychotechnics, Inc., also of Chicago, Illinois.

From the above, it can be seen that there is widespread interest in determining the number of words per printed page and also widespread interest in determining a person's reading rate. However, even though the complexity of the problem has been recognized because of the great variety found in length of printed lines, width and height of various kinds of type fonts, number of lines per page, differences in average word lengths and differences in spacing, there has not been available an inexpensive method and means for measuring the number of words per printed page and which are adaptable to the many variables found in the printed page.

SUMMARY OF THE INVENTION

According to the invention, a gauge is provided comprising a transparent sheet having various guidelines formed thereon and which can be adjusted in various ways with respect to the print on a printed page to determine the approximate number of words per line. In an alternative embodiment, additional guidelines are provided which enable the guage to determine both the approximate number of words per line as well as the number of lines per page. Once these determinations have been made, the approximate number of words per page can be determined for the particular print style to assist in measuring the user's rate of reading.

The mentioned guidelines are based upon the fact that it can be shown that particular words which are repetitively used in any style of printing always constitute a definite percentage of the average word length as later defined in more detail. Noting that the word "the" is the most frequently used word in the English language, the gauge of the invention provides guidelines enabling the width of "the" in the particular style of print to be determined by one set of guidelines and using this width in another set of guidelines to determine the approximate number of words per line in that particular style of print. In the alternative gauge embodiment, additional guidelines and indicia are provided enabling the number of lines per page in the particular print style to also be determined.

DESCRIPTION OF THE DRAWINGS

FIG. 1 and FIG. 2 are drawn to full scale.

DESCRIPTION OF THE PREFERRED EMBODIMENT

Figure 1:
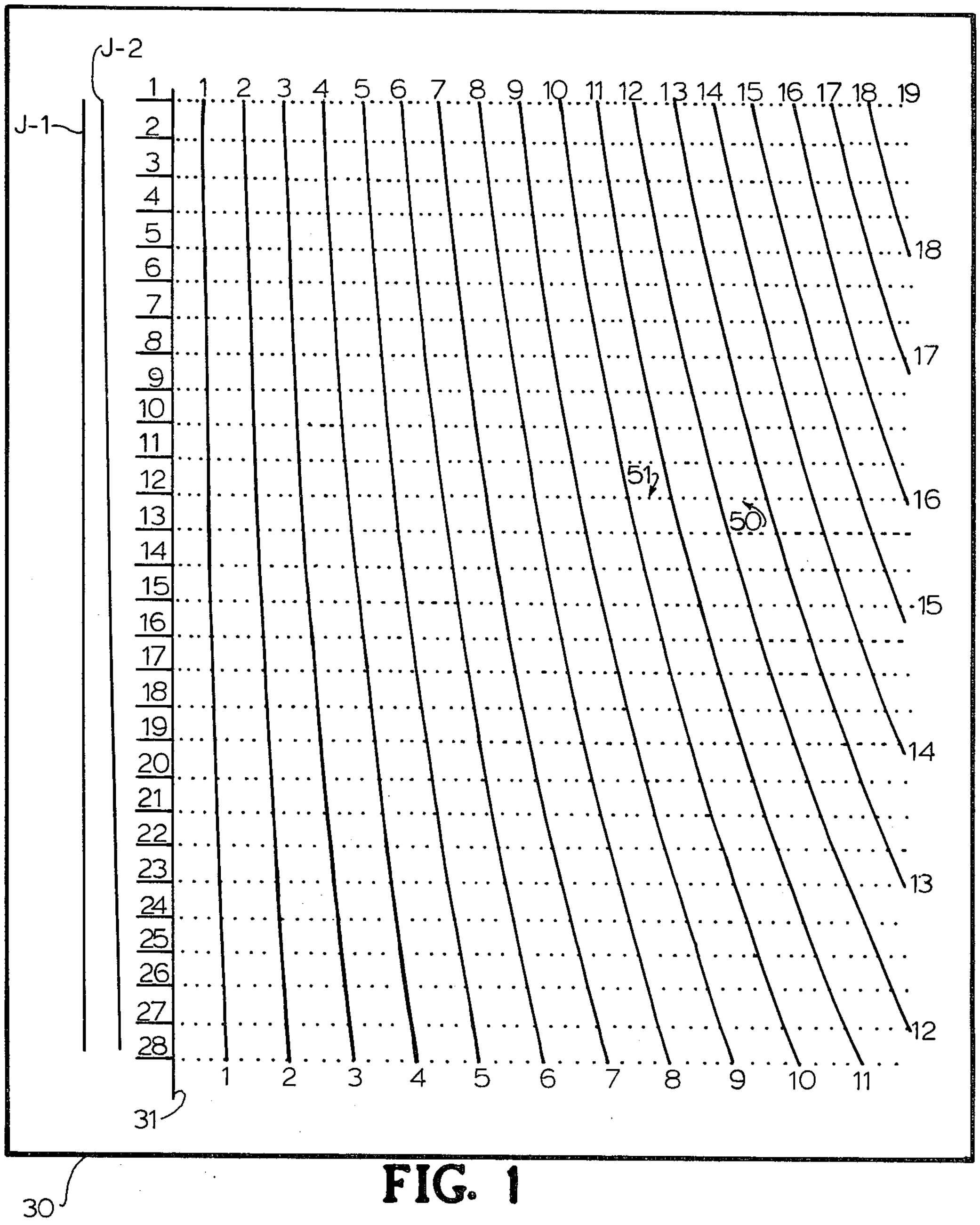
FIG. 1 is a plan view of a transparent sheet gauge having a geometrically-arranged set of lines and indicia located according to the invention for determining the approximate number of words per line for any of a plurality of point types.

Prior to giving a detailed description of the two embodiments of the invention, it should again be noted that the purpose of the gauge of the invention is to assist in determining a reasonable estimate of the number of words per page to assist in speed-reading programs. Further, the gauge of the invention is primarily intended for use with printed pages and not typed print. A plus or minus 15% error is deemed acceptable. However, it has been found that the average error in using the invention will be much less and will approximate an average of about 5%, plus or minus.

Certain concepts need to be stated and understood for background purposes in order to best understand the purpose and use of the gauge of the invention. At the outset, it should be noted that the length of certain collective words bear a measurable relation to the average word length in particular type sizes. It can be noted that the length of the word "the" in a particular type size expressed in inches is substantially equal to one-half of the "standard average word length" in the same type size. This can be proved by creating a "standard average word length" for a particular type size and comparing this to the length of the word "the" in that same type size. By "standard average word length" is meant the number of characters in an "average word length" multiplied by the "average character width". By "average word length" is meant the average length of a word expressed in characters. By "average character width" is meant the average length of a character expressed in inches.

Fundamental to the design and use of the gauge of the invention is the fact that it can be shown that particular words which are repetitively used in any style of printing always constitute a definite percentage of the standard average word length of the "corpus", means that such percentage prevails when one considers all or a majority of such print styles. Since the word "the" is the most frequently used word in the English language, the invention recognizes that the length of "the" is approximately 49% of the average word length of the corpus. This figure was obtained by taking the average ratio of 28 type sizes from 3.5 cpp to 2.15 cpp and which equaled 0.4932 or approximately 49%.

To illustrate how the described relation varies, the ratio of the width of "the" to the standard average word length for 10 font types was found to be as follows:

| | |
|---|---|
| $\frac{.1318}{.2738} = .4814$ | $\frac{.1439}{.2948} = .4881$ |
| $\frac{.1331}{.2778} = .4791$ | $\frac{.1467}{.2995} = .4898$ |
| $\frac{.1359}{.2819} = .4821$ | $\frac{.1495}{.3042} = .4915$ |
| $\frac{.1385}{.2861} = .4841$ | $\frac{.1521}{.3091} = .4921$ |
| $\frac{.1413}{.2904} = .4866$ | $\frac{.1549}{.3142} = .4930$ |

To further illustrate the variable involved in the design and use of the invention structure, it can be shown that the average word length expressed in characters per word varies with the nature of the work. The following table illustrates this fact and is arranged in order of increasing average word length:

| | |
|---|---|
| Fiction, Mystery and Detective | 5.484 |
| Fiction, Romance and Love Story | 5.502 |
| Fiction, Adventure and Western | 5.522 |
| Fiction, General | 5.536 |
| Fiction, Science | 5.763 |
| Humor | 5.757 |
| Religion | 5.861 |
| Popular Lore | 5.898 |
| Belles Lettres | 5.915 |
| Press: Editorial | 5.938 |
| Skills and Hobbies | 5.933 |
| Press: Reportage | 5.991 |
| Press: Reviews | 6.010 |
| Learned and Scientific Writings | 6.073 |
| Miscellaneous: Gov. Documents, etc. | 6.226 |

Turning next to a description of the gauge of the invention according to the first embodiment, the gauge comprises a transparent sheet 30 having a plurality of lines geometrically placed so that by using the gauge the number of words per line on a printed page can be determined.

On the left side of the gauge shown in FIG. 1 there is provided what will be called a set of jammer lines forming what will be called the "jammer". One jammer line is identified by the designation J-1 and the other jammer line is designated as J-2. It will be further noticed that to the right of the jammer lines there is provided a vertical reference line 31 and at various evenly-spaced vertical levels there is provided a set of horizontal lines numbered 1–28 and which are extended in perpendicular relation to reference line 31 and on the same level by a plurality of dots. To the right of reference line 31 the gauge includes additional vertically oriented, non-parallel lines numbered 1–18 and it will be seen that these lines 1–18 intersect the dotted lines 1–28, previously referred to, to form what will be called the jammer grid. Other reference indicia could be substituted for numbers 1–28.

The set of jammer lines J-1, J-2 relate the width of the word "the" to the standard average word length for a particular genre. The distances between the vertically oriented lines 1–18 forming the jammer grid are directly and constantly proportional to the standard average word lengths to which they are related. This is a natural and inherent occurrence regardless of the font of type employed which determines the distances and the related average word lengths.

Lines J-1, J-2 are laid out so that the distances, i.e., the "the" widths, between the lines J-1, J-2 at any level are perpendicular to a real or an imaginery line representing the height of the set of lines J-1, J-2 and, also, each such distance varies directly with average word length of the horizontal scale closest to it or referred to it by its associated line of dots. All such distances are also directly proportional to the average word length of the horizontal scale closest to each one of the said distances.

The mentioned distances between the lines J-1 and J-2 forming the jammer can also be said to be based on the lengths of a particular word as said lengths vary with the character widths from the font of type of which the word is composed. One of the criteria for selection of an aforedescribed particular word on which to base the jammer is its nearness to constant proportion in the mathematical relationship of word length to average word length as the terms of said relationship vary by type font. Another criterium for selection of an aforedescribed word is that particular word's high frequency of occurrence in the written language from which it came. While lower case "the" is preferred, the invention could be based on any of the following words: the, of, and, to a, in, that, is, was, he, for, it, with, as his, on, be, at, by, I, etc. In FIG. 1, the gauge of the invention is based on the uncapitalized or, in other words, the lower case word "the". The gauge of the invention could, of course, be based on any of the above mentioned words when they begin with capital letters, such as, The, And, He, etc.

The data needed and the method of laying out a gauge according to FIG. 1 will be less apparent to those skilled in the art. While the problem of laying out a gauge according to FIG. 1 may be approached from different viewpoints, the approach which was taken by the present inventor was to first locate the vertical base line 31 and the vertical spacing of the horizontal reference lines numbered 1–28. Here it should be noted that the space between the lines 1–28 is to some extent arbitrary but such spaces should be equal in distance and once lines 1–28 and base line 31 are fixed, the remaining lines, dots, et cetera, are located in reference thereto. With respect to locating the lines numbered 1–18, it is necessary to determine the standard average word lengths for a wide range of genre's of literature.

A standard average word length is defined on the horizontal scales as the distance between points of intersection of the vertical reference line 31 and the other near-vertical lines 1–18 with the horizontal lines of the aforedescribed horizontal scales. Wherever there are these aforedescribed points of intersection there could be in their stead other marks having the same function of these points of intersection. The actual predetermined distance between the said points of intersection was arrived at by a formula which took into consideration the following:

A. Fifteen genres of literature (A genre of literature would be, for example, learned and scientific writing or, another example, simple fiction) which was one million seven thousand thirty-five words large as a combined total of all the genres.

B. Then, for each genre, scalar length data, e.g., character width data and space width data obtained from Merganthaler Linotype Company and Harris Intertype Company, was substituted to arrive at an average word length for each genre as this character width data and space width data varied, e.g., as the fonts of different type faces varied. The crux of the formula was to divide the total space in inches taken up by a genre as if said genre was composed of a particular font (a particular type size of a particular type face) of type and then to divide that total space by the number of words comprising that genre which quotient was the standard average word length for that genre.

The data was manipulated by computer. The computer program held the genre data constant and varied the font data. Font data was obtained for 33 fonts of the most popular type faces, i.e., Bodoni, Baskerville, Century, Helvetica, etc.

Before discussing how the gauge of the first embodiment is used, it should be noted that the dots which form the horizontal lines previously discussed also serve another function. In particular, these dots are located so as to break up the space between the lines numbered 1–18 into proportional parts.

To explain a typical use of the gauge of FIG. 1, it will be assumed that the genre related to the jammer grid constitutes science fiction. The jammer grid is placed over the word "the" on a printed page and the jammer grid lines J-1, J-2 are moved with reference to the word "the" until the word "the" barely touches the jammer grid lines on either side. For example, assume that "the" touches jammer lines J-1, J-2 in this fashion opposite horizontal line 12. Reference line 31 is next placed on the left edge of the print on the printed page and the user places horizontal line 12 and the dots which extend horizontal line 12 beneath one of the printed lines being measured. Next, the right end of the line is observed in relation to where it terminates in respect to the vertical lines 1–18. Assume, for example, that the right end of such a printed line terminated at the point indicated by the arrow 50, this would mean that such a line contained 12½ standard average word lengths per line. As another example, suppose that such a line terminated at the point indicated by arrow 51. This would mean that 10½ standard average word lengths were contained per line.

To further illustrate use of the invention, the following example is given.

EXAMPLE

Page 381 of the book *The Captain*, by Jan de Hartog (1966 edition), published by Macmillan and Stuart, Ltd. of Canada and also by Atheneum Press, New York, New York, was measured with a gauge as shown in FIG. 1. The number of printed lines on the page was first counted and it was found that there was a total of 34. The word "the" was then selected from this same page and was used with the jammer grid J-1, J-2 with the finding that it jammed opposite horizontal line 21. Reference line 31 was then aligned with the left margin of the print on the page and the dotted extension of line 21 was followed to a point where the printed line being measured terminated in respect to the vertical lines 1–18. From the scale reading at this point, a measurement of 9¾ standard average word lengths per line was obtained. The number of lines previously counted was then multiplied by the number of standard average word lengths per line obtained and this indicated 332 words per page. An actual count of words on the page was made with the finding that the total was 340. The 2.35 percent error is seen to be nominal and well within the tolerances needed for speed-reading measurements.

Figure 2:
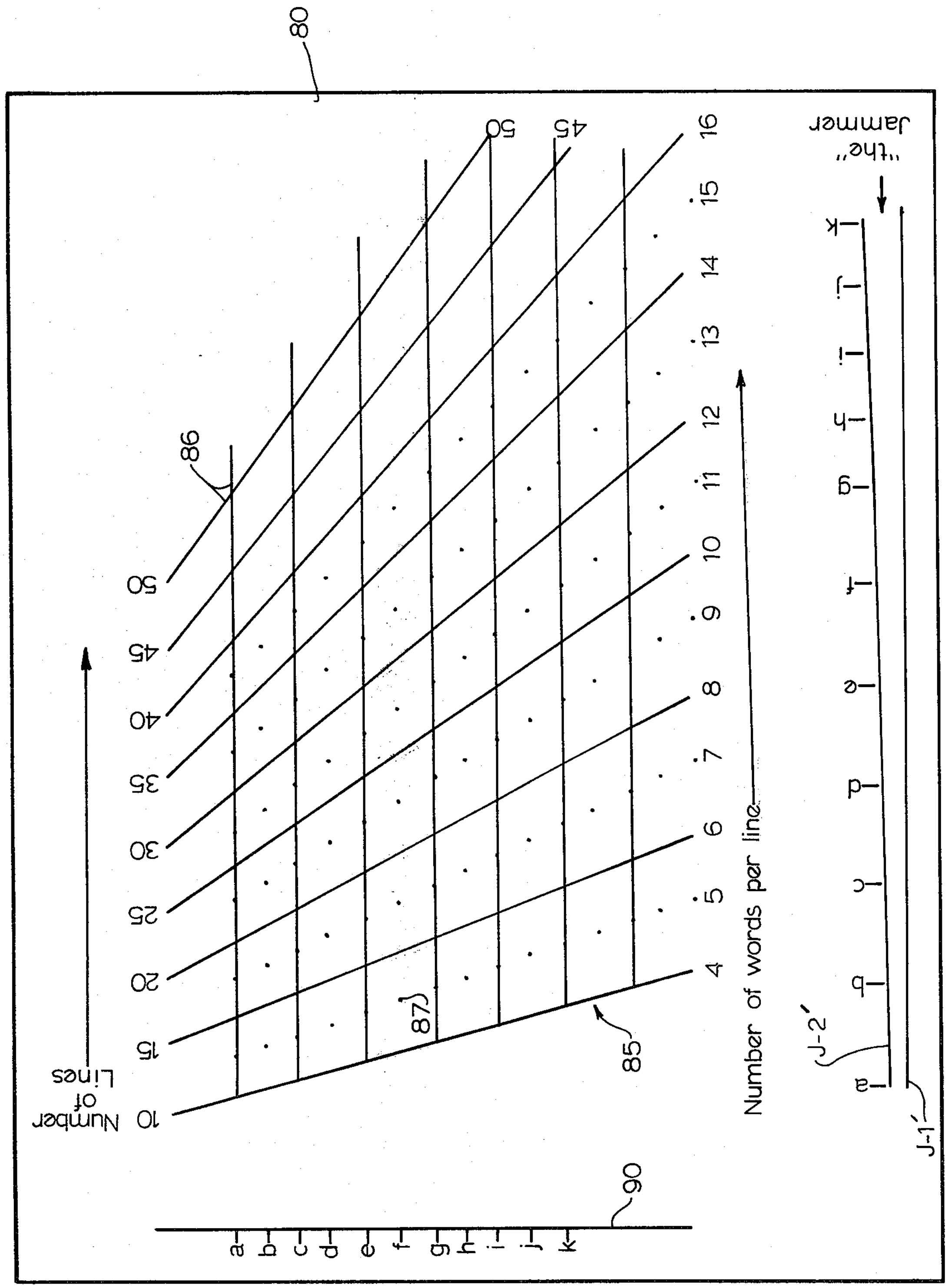
FIG. 2 is a plan view of a transparent sheet gauge in an alternative embodiment having a geometrically-arranged set of lines and indicia according to the invention for determining both the approximate number of words per line for any of a plurality of point types and additionally the number of lines per page for the same plurality of point types so the number of words per page can be estimated.

A second embodiment of the invention is illustrated in FIG. 2. As compared to the embodiment illustrated in FIG. 1, the FIG. 2 embodiment is intended to provide a means for determining both the average number of words per line and in addition the number of lines per page so that by multiplying these two amounts obtained from the single gauge of FIG. 2, the estimated number of words per page can be calculated.

Referring to FIG. 2, it will be noted that the transparent gauge 80 has various geometrical lines, indicia and captions inscribed thereon as illustrated. As with the first embodiment, there is provided a "jammer" based on the word "the" and formed by converging lines J-1' and J-2' corresponding to J-1, J-2 lines of the first embodiment. It will also be noticed that to the right of the jammer lines J-1', J-2' there is provided a set of short horizontal lines labeled *a–k*, respectively. As with the first embodiment, the jammer lines J-1', J-2' enable the user to obtain a "the" width for a particular style of print and relate that width to the reference letters *a–k*. It will be noted that the letters *g–k* are more closely spaced than are the letters *a–g*. It may also be noticed that the jammer line J-1' is straight whereas the jammer line J-2' is straight between the reference letters *a–g* in one direction and then is straight in a slightly more angled relation between the letters *g–k*. This particular arrangement of the configuration of jammer lines J-1' and J-2' takes into account the relative frequency of "the" widths which fall between the letters *g–k* as compared to the number of "the" widths which fall between the letters *a–g* during use of the gauge. Other reference indicia could be substituted for letters *a–k*.

With gauge 80 remaining in the same orientation as depicted in FIG. 2, it will be noted that there is also provided a grid 85 consisting of solid lines 86 and rows of dots 87 midway between the solid lines. Above the grid 85 is a horizontal reference line 90 provided with short vertical lines labeled *a–k*, respectively. It will also be noted that to the left of the grid there is set forth a vertical array of reference numerals of from 4 to 16 in consecutive order together with the label "Number of Words Per Line" and a vertical downwardly-pointed arrow. Likewise, to the right of the grid there is also a vertically disposed series of reference numerals identified as 10, 15, 20, 25, 30, 35, 40, 45 and 50 and the label "Number of Lines" with an associated vertical downwardly pointed arrow.

Turning the gauge 90° from the orientation of FIG. 2 enables the reference line 90 and the related letter indicia *a–k* to be vertically oriented while both sets of reference numerals and their associated labels become horizontally oriented.

The gauge of FIG. 2 is used to determine the number of words in any printed reading selection whether it be in magazine, newspaper, or in book form so that by computation or use of the tables reading rate in words per minute can be determined and monitored with a critical eye toward improving reading rate. The manner of using the FIG. 2 gauge to determine both the average number of words per line and the number of lines per page and from these, by simple multiplication, the approximate number of words per page will next be explained.

First, a reading selection is chosen. This selection should be roughly five to seven pages (or approximately 2000 words) where the pages contain the approximate same number of lines per page or where the columns of print are not interrupted by "run arounds", e.g., the width of which columns are not different lengths to accommodate pictures, graphs, diagrams, et cetera. Second, the number of words per line is determined. In the first step to accomplish this, the gauge 80 is oriented as in FIG. 2 and the jammer comprising lines J-1' and J-2' is placed over the lower case word "the" until this word appears to fit or "jam" between the jammer index lines. The index letter, i.e., *a, b, c, d, e, f, g, h, i, j,* or *k,* to which the "the" is closest is noted. Next, gauge 80 is turned 90° from the FIG. 2 position for a reading of the numbers of words per line and one of the complete print lines is measured at the letter indicated by the jammed "the". A "complete" print line is one of the longest print lines on the page or in the column. Once a complete print line has been located, the reference line 90 is placed vertically against the margin of the print on the left side of the page. The letter indicated by the jammed "the" is positioned at the beginning of the selected complete print line. This print line is then followed to the right and its termination point is observed in reference to the lines slanting down to the right and terminating in the scale, 4–16. The slanting line closest to the print line termination is noted and the numerical scale marking for this line gives the number of words per print line.

Third, the number of lines on a page are determined. For this purpose, gauge 80 is oriented as in FIG. 2 and placed over the printed page so that the top horizontal reference line 90 is beneath the first print line. Next, the first ten print lines are counted and the point of intersection of the tenth print line with the first slant line is noted. Then, the last slant line on the printed portion of the page directly below the aforementioned point of intersection is located. The reference numeral on the right extremity of this slant line gives the number of lines on the printed page. Where a column of print is longer than the length of gauge 80, two different readings are taken and added to determine the number of lines in the column. The number of lines per page multiplied by the number of pages equals the number of lines in a reading selection of a book if all the print lines were comcomplete, which most often they are not. In order to compensate for the fact that there are shorter lines, these shorter lines are counted, their number divided in half, and this quotient is subtracted from the number obtained by simply multiplying the number of pages by the number of lines on these pages. The difference is the number of complete print lines worth of print in the reading selection.

Fourth, the number of complete print lines worth of print is mutliplied by the number of words per print line in order to obtain the number of words contained in the reading selection.

Fifth, once the number of words in the reading selection is derived, by dividing this number by the number of minutes it takes to read this number of words, the reading rate in words per minute can be obtained.

I claim:

1. A gauge for determining the number of words per line on a printed page:

(a) a rectangular transparent sheet adapted for having measuring indicia inscribed thereon and for being superimposed on a page of printed material; and (b) measuring indicia inscribed thereon including:

(i) a pair of opposing substantially vertically oriented measuring lines positioned along the left side of said transparent sheet and spaced such that the distance between them gradually increases in a downward direction, said lines being adapted to measure the width of a selected word having a high frequency occurrence in the English language by vertically moving said opposed measuring lines over said word on the printed page until said word fits the space between said lines;

(ii) a vertically extending reference line juxtaposed to the right of said pair of vertically oriented guidelines;

(iii) a plurality of equally spaced parallel guidelines extending from and to the right of said reference line in perpendicular relation thereto to form horizontally disposed guidelines along the length of said reference line;

(iv) a series of spaced, generally vertically oriented guidelines positioned to the right of said reference line and intersecting said horizontally disposed guidelines to form a grid therewith, said generally vertically oriented guidelines being spatially arranged such that the distance between adjacent points of intersection with said horizontally disposed guidelines at any vertical level bears a constant proportional relation to the distance between said pair of opposing substantially vertically oriented measuring lines at the same vertical level; and (v) a first scale in which each horizontally disposed guideline is identified by a reference indicia and a second scale wherein each generally vertically oriented guideline is likewise identified by a numerical value representative of the average number of words in a line, thereby adapting said gauge to be employed for determining the number of words per line on a printed page to be determined by locating and jamming the selected word between said pair of opposing vertical lines, noting the corresponding reference indicia on said first scale, aligning said reference line with the left vertical edge of the printing on said printed page and with the said horizontal guideline corresponding to said first scale indicia beneath a line of print on said page and finally noting where the line of print above said horizontal guideline terminates in reference to the closest of said vertical guidelines and using the numerical values of said scale assigned to indicate said number of words per line.

2. The gauge of claim 1, wherein said pair of opposing substantially vertically oriented measuring lines are adapted to determine the width of the word "the" on said printed page.

3. A gauge for determining both the number of words per line and the number of lines per page on a printed page comprising:

(a) a rectangular transparent sheet adapted for having measuring indicia inscribed thereon and for being superimposed on a page of printed material; and (b) measuring indicia inscribed thereon including:

(i) a pair of opposing substantially vertically oriented measuring lines positioned along the left side of said transparent sheet when said sheet is in a first position and spaced such that the distance between them gradually increases in a downward direction, said lines being adapted to measure the width of a selected word having a high frequency of occurrence in the English language by vertically moving said opposed measuring lines over said word on the printed page until said word fits the space between said lines, said pair of measuring lines having a set of reference indicia spaced vertically thereon and providing a vertical reference location for a said selected word fitted therebetween;

(ii) a vertically extending reference line positioned along the left side of said sheet when moved to a second position rotated 90° from said first position, said reference line having a set of equally spaced reference indicia thereon duplicating the said reference indicia associated with said pair of measuring lines;

(iii) a plurality of equally spaced parallel guidelines adjacent to and extending to the right of said reference line in perpendicular relation thereto to form when said sheet is in said second position horizontally disposed guidelines along the length of said reference line, said horizontal guidelines being aligned with respective said reference indicia on said reference line;

(iv) referenced to said sheet in said second position a series of spaced, generally vertically oriented guidelines positioned to the right of said reference line and intersecting said horizontally disposed guidelines to form a grid therewith, said vertically oriented guidelines being spatially arranged such that the distance between the points of intersection with said horizontally disposed guidelines at any vertical level bears a constant proportional relation to the distance between said pair of opposing substantially vertically oriented measuring lines at the vertical level indicated by said reference indicia on said vertical reference line, said generally vertically oriented guidelines having numerical indicia located at the bottom end thereof and positioned to be read when said sheet is in said second position to indicate the average number of words per line by first locating with reference to said reference indicia where said selected word fits between said opposing measuring lines with said sheet in said first position, by then turning said sheet to said second position and aligning said reference line along the left edge of the said printed page and with the appropriate horizontal guideline corresponding to the appropriate reference indicia identified placed below a line of said page noting the intersection between the end of such line and the closest said generally vertical guideline and finally noting the numerical indicia associated therewith as indicating said number of words per line; and (v) a second set of numerical indicia located at the right end of said generally vertical guidelines and in a vertical array when said sheet is in said first position, said second set of numerical indicia starting with the number "10" and extending through the number "50", thereby enabling the number of lines per page to be determined by placing said reference line horizontally and below the first print line, noting the intersection of the tenth print line with the first slant line, previously referred to as a generally vertical guideline, locating the guideline nearest to the last printed line on the page vertically below the mentioned point of intersection and noting the numeral on the right extremity of such guideline as indicating the number of lines on the page.

* * * * *